United States Patent [19]
Lee

[11] 3,944,430
[45] Mar. 16, 1976

[54] RECHARGEABLE GALVANIC CELL AND ELECTROLYTE THEREFOR-II
[75] Inventor: Tien Shuey Lee, Rocky River, Ohio
[73] Assignee: Union Carbide Corporation, New York, N.Y.
[22] Filed: Sept. 18, 1970
[21] Appl. No.: 73,582

[52] U.S. Cl. .................. 136/30; 136/107; 136/154; 136/155
[51] Int. Cl.$^2$.......................................... H01M 6/04
[58] Field of Search ............ 136/30, 129, 107, 154, 136/155, 163, 164, 125, 127; 204/55 R

[56] References Cited
UNITED STATES PATENTS

| | | | |
|---|---|---|---|
| 2,566,114 | 8/1951 | Bloch................................. | 136/155 |
| 3,160,526 | 12/1964 | Ruetschi............................ | 136/154 |
| 3,291,646 | 12/1966 | Gould................................ | 136/154 |
| 3,594,235 | 7/1971 | Moran............................... | 136/154 |
| 3,620,848 | 11/1971 | Epstein et al...................... | 136/138 |

OTHER PUBLICATIONS

Bockris, Second Quarterly Report (Apr. 1, 1969–June 30, 1969), Studies in Fundamental Chemistry of Fuel Cell Reactions, University of Pennsylvania, pp. 7–21.
Ilzro, Plating From Alkaline Solutions, General Electric Progress Report No. 7, for Jan. 1, 1968 to June 30, 1968, p. 2.
Bauer, Batteries For Space Power Systems, NASA SP–172, Scientific and Technical Information Division, NASA, Washington, D.C., 1968, p. 156.

*Primary Examiner*—Donald L. Walton
*Attorney, Agent, or Firm*—Cornelius F. O'Brien

[57] ABSTRACT

A rechargeable galvanic cell having a zinc anode and a zinc-containing electrolyte which comprises an aqueous alkaline or aqueous acidic medium containing dissolved zinc ions and a quaternary ammonium compound for suppressing zinc dendrite formation during the charging cycle.

13 Claims, No Drawings

RECHARGEABLE GALVANIC CELL AND ELECTROLYTE THEREFOR-II

This invention relates to rechargeable galvanic cells having improved zinc containing electrolytes which contain quaternary ammonium compounds for suppressing the formation of zinc dendrites during the charging cycle.

When zinc is electrolytically plated out of an alkaline zincate solution at relatively high current densities and relatively low zincate ion concentrations, there is a tendency to deposit the zinc in the form of long dendritic crystals. The tendency is a considerable drawback to the use of zinc electrodes in rechargeable alkaline cells, because as a cell of this type is charged, the dendritic crystals grow out and away from zinc electrodes which serve as a substrate. Ultimately, these crystals penetrate the separators interposed between the electrodes and internally short circuit the cell. The cycle life of the rechargeable cell is thus materially reduced.

Efforts to alleviate the situation existing with rechargeable alkaline cells heretofore have centered primarily on the development of new separator materials and on the use of thicker or multi-layer separators. Unfortunately, this approach limits the oxygen gas transfer within the cell for the purposes of recombination during an overcharge of the cell containing the zinc electrode. This condition is particularly troublesome in conjunction with sealed rechargeable cells since high gas pressure can develop within the cells.

An alternate approach to the elimination of zinc dendrites that has been explored is the reported suppresion of zincate ions in the alkaline electrolytes commonly employed. This approach is illustrated by the silver oxide-zinc cells of Mendelsohn et al., U.S. Pat. No. 2,994,625. In this patent, the presence of zincate in the electrolyte is eliminated by substantially saturating the electrolyte with ions of certain amphoteric metals, particularly with aluminates.

A somewhat similar problem with dendrite formation is encountered on charging a zinc electrode in aqueous acid solutions, although the current densities at which dendrite formation begins are generally somewhat higher than in alkaline solutions. For example, dendrites will tend to form on charging of a zinc electrode at current densities higher than about 30–40 mA/cm$^2$ in aqueous $ZnCl_2$ electrolyte (3 M). Even at lower charging current densities in these acidic electrolytes, the zinc deposit is not always desirably level and uniform.

The present invention is based upon the discovery that the provision in a zinc-containing aqueous electrolyte of one or more quaternary ammonium compounds serves to suppress the formation of zinc dendrites in rechargeable galvanic cells and to produce level, uniform and adherent zinc deposits on charging.

It is a principal object of the invention to provide a zinc containing electrolyte from which a substantially level and adherent zinc deposit can be electroplated.

It is another object of the invention to provide a zinc containing electrolyte which decreases the tendency of a rechargeable galvanic cell employing a zinc electrode to form dendrites on the zinc electrode during charging.

It is another object of the invention to provide means for extending the cycle life of rechargeable zinc cell.

A further object of the invention is to provide an alkaline zincate or acidic zinc electrolyte containing one or more quaternary ammonium compounds.

Other objects of the invention will be apparent from a reading of the accompanying specification and claims.

The foregoing objects of the invention are achieved by an electrolyte which is an aqueous acidic or alkaline medium containing zinc or zincate ions and one or more quaternary ammonium compounds.

The aqueous alkaline media that are employed in the electrolytes of the invention are aqueous solutions of alkali metal hydroxide, for instance, sodium hydroxide, potassium hydroxide, lithium hydroxide, and the like. The choice of the particular hydroxide is not narrowly critical, and will depend upon factors such as the type of service intended for the galvanic cell, the desired conductivity of the electrolyte, and the economics of the intended application. Such factors are well-known to those having ordinary skill in the art. For high rate cells having universal application, potassium hydroxide is preferred. As is well-known in the art, the concentration of alkali metal hydroxide in the aqueous alkaline electrolyte can vary from about 1 to about 16 molar, and preferably from about 6 to about 12 molar.

The aqueous acidic media that are employed in the electrolytes of the invention are aqueous solution of either zinc salts, e. g., zinc chloride, zinc sulfate, etc., or zinc salts plus ammonium salts, such as ammonium chloride, ammonium sulfate, etc. The choice of the particular zinc salt is not narrowly critical, and will depend upon factors such as the type of service for which the galvanic cell is intended, the desired conductivity of the electrolyte and other electrochemical properties. Such factors are well known to those having ordinary skill in the art. For ordinary applications, the combination of zinc chloride and ammonium chloride is preferred. The concentration of the zinc salts in the aqueous acidic electrolyte can vary from about 1 to 6 molar and preferably from about 2 to 4 molar.

Zinc can be introduced into the electrolyte in the desired amounts by way of any zinc bearing compounds which are soluble in the electrolyte. For instance, compounds such as zinc oxide, potassium zincate, sodium zincate, zinc chloride, zinc sulfate, and the like can be used. Zinc oxide is the preferred compound for this purpose in alkaline medium because of its adequate solubility, and also because no extraneous metal ions are introduced into the electrolyte upon dissolution. Zincate ions are formed in the alkaline solution as the zinc-bearing compound dissolves therein. Zinc can also be introduced into the electrolyte by an anodic dissolution of zinc from an anode material of the cell.

The materials that are employed in the electrolyte to suppress zinc dendrite formation are the quaternary ammonium compounds. Such compounds include quaternary tetraalkyl or mixed alkyl/aryl ammonium hydroxides, halides such as chlorides, bromides, and iodides, perchlorates, tetrafluoroborates, phosphates, organic salts such as acetates, benzoates, and the like. The effective constituents in these additives are the quaternary ammonium cations. The nature of the anion appears to be immaterial.

Specific illustrative quaternary ammonium compounds that can be used in the invention include: alkyl ammonium compounds such as tetramethylammonium hydroxide, tetraethylammonium hydroxide, tetraethylammonium perchlorate, tetraethylammonium acetate, tetraethylammonium bromide, tetraethylammonium benzoate, methyltriethylammonium hydroxide, tetraethylammonium iodide, tetraethylammonium phosphate, tetraethylammonium chloride, tetraethylammonium tetrafluoroborate, trimethyldodecylammonium chloride, methyltri-n-butylammonium iodide, and other mixed alkylammonium compounds; mixed alkyl and aromatic ammonium compounds such as trimethylphenylammonium hydroxide, trimethylbenzylammonium hydroxide, trimethylphenylammonium chloride, trimethylbenzylammonium chloride, and the like; mixed alkyl hydroxyalkyl ammonium compounds such as triethyl(2-hydroxyethyl)ammonium chloride, trimethyl(2-hydroxyethyl)ammonium hydroxide, and the like.

The preferred quaternary ammonium compounds are those wherein the cation

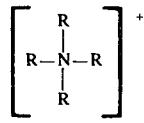

contains alkyl groups (R) having from 1 to over 12 carbon atoms, or in the case of aromatic derivatives one or more aryl or aralkyl groups such as phenyl or benzyl may be substituted for the alkyl groups. Tetraethylammonium hydroxide and its salts and trimethylphenylammonium hydroxide and its salts are the most preferred compounds for use in alkaline media; whereas, in acidic media the quaternary alkyl ammonium compounds having at least one longer carbon chain (i.e., $C_4$ or longer) are the most preferred, such as methyltri-n-butylammonium iodide and trimethyldode-cyclammonium chloride.

The quaternary ammonium compound is employed in the electrolyte in an amount sufficient to suppress the formation of zinc dendrites on charging. For instance, concentrations of from about $5 \times 10^{-4}$ to about $5 \times 10^{-1}$ molar, and preferably from about $1 \times 10^{-3}$ to about $5 \times 10^{-3}$ molar, have been found to be useful for this purpose.

The additive can simply be dissolved in the electrolyte, or it can be incorporated in the electrolyte by coating the additive on an electrode, e.g., the anode, and permitting the additive to dissolve in the electrolyte over a period of time. In the case of low solubility of the additive in the electrolyte, it can be used in the form of an emulsion with the electrolyte. Alternatively, the additive can be incorporated in a particulate zinc anode by mixing it with the powdered zinc during fabrication of the electrode.

In the rechargeable galvanic cells contemplated by the invention, zinc is employed as the anode. The anode can be massive zinc, or it can be zinc plated on another metal, or it can be powdered zinc mixed with zinc oxide compressed on a suitable metal grid or screen. The active cathode material can be either a gas, such as air or oxygen, or a solid material such as nickel oxide, silver oxide, lead dioxide, mercuric oxide or manganese dioxide, etc.

The following examples illustrate the practice of the invention.

EXAMPLE 1

In Alkaline Media

A galvanic cell was constructed employing an epoxy-lined 30-ml beaker as the container. The electrolyte employed was 9 N potassium hydroxide containing 5 weight per cent zinc oxide and was made from reagent grade chemicals and distilled water. Both the anode and the cathode of the cell were made from pure zinc discs. Only one side of each disc, which side had an active face area of about 2 $cm^2$, was exposed to the electrolyte. The remaining electrode surfaces were electrically insulated with epoxy. The exposed surfaces of the electrodes were prepared by first abrading them with abrasive paper down through 00 grade and then etching them in an 18 weight per cent hydrochloric acid solution containing about 1 – 3 weight per cent nitric acid. Finally, the electrodes were rinsed thoroughly in distilled water and placed in the cell. The test cell was charged and discharged using direct current from an external power supply in series with a variable resistor. The charging current was varied from a few milliamperes to about 30 milliamperes per $cm^2$ of electrode surface. During charging, metallic zinc was deposited onto that zinc electrode which was intended to be the anode in a rechargeable cell system. The deposit was nonadherent and ranged in form from mossy zinc to crystalline zinc dendrites in the charging current density range employed. As tetraethylammonium hydroxide or its salts were added to the electrolyte in a final concentration of about $5 \times 10^{-4}$ to $1 \times 10^{-2}$ molar, the deposit obtained at the zinc electrode during charging became adherent and smooth. After more than ten continuous charge-discharge cycles the final deposit obtained after the last charging cycle was still smooth and adherent. It is expected that even after several hundred continous charge-discharge cycles, the final deposit would still be smooth and adherent. Based upon this fact, the additives of this invention would be very beneficial in a rechargeable cell employing a zinc anode.

Another good feature of this invention is that the effectiveness of that additive was not destroyed by electrolysis at both electrodes during charge-discharge cycling. The following experiment illustrates this point: A pair of pure nickel electrodes were placed in a cell containing only 9 N potassium hydroxide solution and $1 \times 10^{-3}$ molar tetraethylammonium hydroxide dissolved therein. Continuous electrolysis was carried out for 76 hours by supplying to the pair of nickel electrodes a direct current of 30 $mA/cm^2$. The nickel electrodes were then removed and 5 weight per cent zinc oxide was dissolved in the electrolyzed solution. Finally, zinc electrodes were placed in the electrolyzed solution, and charging and discharging from an outside d.c. source was begun. The deposit obtained during the charging cycle was still smooth and adherent at a current density ranging from a few to about 30 $mA/cm^2$ as indicated in the preceding paragraph.

Other examples of additives in alkaline media which produced smooth zinc deposits during the charging cycle are the following:

(1)

Electrolyte: 9 N KOH, 5 weight per cent ZnO
Additive: trimethylphenylammonium hydroxide (or chloride) $1 \times 10^{-3}$ M
Charging Current Density: 30 $mA/cm^2$ (2)

Electrolyte: 9 N KOH, 5 weight per cent ZnO

Additive: methyltri-n-butylammonium iodide, $1 \times 10^{-3}$ M

Charging Current Density: 20 mA/cm$^2$ (3)

Electrolyte: 9 N KOH, 5 per cent ZnO
Additive: triethyl(2-hydroxyethyl)ammonium iodide, $5 \times 10^{-4}$ M
Charging current density: 30 mA/cm$^2$ (4)

Electrolyte: 9 N KOH, 5 weight per cent ZnO
Additive: trimethylbenzylammonium chloride, $1 \times 10^{-3}$ M
Charging Current Density: 30 mA/cm$^2$

EXAMPLE 2

The following are examples of additives in acidic electrolytes:

For the tests in acidic media, the test cell was assembled using an unlined PYREX beaker as the container. The procedure of treating the electrodes was the same as that used for alkaline media. The electrolyte was a 3 molar zinc chloride solution made from analytical reagent grade chemicals and distilled water. Greater current densities could be used during the charging cycle than were used in alkaline media. Without the additives of this invention, the deposit obtained during the charging cycle was uneven and dendritic. In the presence of the additives, the deposit obtained during the charging cycle was smooth and nondendritic. The following are specific examples of conditions under which the deposits obtained during the charging cycle were smooth:

(1)

Electrolyte: 3 M ZnCl$_2$
Additive: methyltri-n-butylammonium iodide, $3 \times 10^{-3}$ M
Charging Current Density: 80 mA/cm$^2$ (2)

Electrolyte: 3 M ZnCl$_2$
Additive: trimethyldodecylammonium chloride, $3 \times 10^{-3}$ M
Charging Current Density: 60 mA/cm$^2$

What is claimed is:

1. A rechargeable galvanic cell including a zinc anode, a cathode, and an electrolyte, wherein the electrolyte comprises an aqueous solution containing soluble zinc and a quaternary ammonium compound in an amount sufficient to suppress formation of dendrites on said zinc anode during charging of the cell, said amount being a concentration of said quaternary ammonium compound in said electrolyte within the range of from about $5 \times 10^{-4}$ molar to about $5 \times 10^{-1}$ molar.

2. The rechargeable galvanic cell of claim 1 wherein the electrolyte is alkaline.

3. The rechargeable galvanic cell of claim 1 wherein the electrolyte is acidic.

4. The rechargeable galvanic cell of claim 1 wherein the quaternary ammonium compound is selected from the group consisting of tetraalkylammonium compounds, trialkyl(hydroxyalkyl)ammonium compounds, trialkylarylammonium compounds, and trialkylaralkylammonium compounds.

5. The rechargeable galvanic cell of claim 1 wherein the quaternary ammonium compound is a compound of the formula:

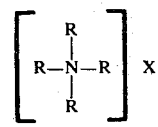

wherein each R individually represents a member of the group consisting of alkyl of up to 12 carbon atoms, hydroxyalkyl, aryl, and aralkyl; and wherein X represents an anion.

6. The rechargeable galvanic cell of claim 5 wherein the hydroxyalkyl is 2-hydroxyethyl, wherein the aryl is phenyl, and wherein the aralkyl is benzyl.

7. The rechargeable galvanic all of claim 1 wherein the quaternary ammonium compound is present in the electrolyte in a concentration of from about $1 \times 10^{-3}$ molar to about $5 \times 10^{-3}$ molar.

8. The rechargeable galvanic cell of claim 2 wherein the quaternary ammonium compound is a tetraethylammonium compound or a trimethylphenylammonium compound.

9. The rechargeable galvanic cell of claim 3 wherein the quaternary ammonium compound is a tetraalkylammonium compound wherein from one to three of the alkyl groups has from 4 to 12 carbon atoms, the remainder of the alkyl groups having less than 4 carbon atoms.

10. The rechargeable galvanic cell of claim 9 wherein the alkyl groups having less than 4 carbon atoms are methyl.

11. The rechargeable galvanic cell of claim 1 wherein the active cathode material is oxygen, nickel oxide, silver oxide, lead dioxide, mercuric oxide, or manganese dioxide.

12. A galvanic cell comprising an anode, a cathode, and an electrolyte wherein the electrolyte comprises an aqueous solution containing soluble zinc and a quaternary ammonium compound, said concentration of the quaternary ammonium compound in said electrolyte being within the range of from about $5 \times 10^{-4}$ molar to about $5 \times 10^{-1}$ molar.

13. The galvanic cell of claim 12 wherein the anode is zinc.

* * * * *